(12) United States Patent
Oh et al.

(10) Patent No.: US 11,760,646 B2
(45) Date of Patent: Sep. 19, 2023

(54) LOW-DUST SILICA AEROGEL BLANKET AND METHOD FOR MANUFACTURING SAME

(71) Applicant: LG CHEM, LTD., Seoul (KR)

(72) Inventors: Myung Eun Oh, Daejeon (KR); Kyu Reon Lee, Daejeon (KR); Je Kyun Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 631 days.

(21) Appl. No.: 16/762,675

(22) PCT Filed: Sep. 19, 2018

(86) PCT No.: PCT/KR2018/011078
§ 371 (c)(1),
(2) Date: May 8, 2020

(87) PCT Pub. No.: WO2019/098519
PCT Pub. Date: May 23, 2019

(65) Prior Publication Data
US 2021/0114887 A1     Apr. 22, 2021

(30) Foreign Application Priority Data

Nov. 16, 2017  (KR) .................. 10-2017-0153280

(51) Int. Cl.
| | | |
|---|---|---|
| *C01B 33/158* | (2006.01) | |
| *C09D 7/61* | (2018.01) | |
| *C01B 33/159* | (2006.01) | |
| *C04B 28/26* | (2006.01) | |
| *C04B 111/00* | (2006.01) | |

(52) U.S. Cl.
CPC ........ *C01B 33/1585* (2013.01); *C01B 33/159* (2013.01); *C04B 28/26* (2013.01); *C09D 7/61* (2018.01); *C01P 2006/90* (2013.01); *C04B 2111/00568* (2013.01); *C04B 2111/00577* (2013.01)

(58) Field of Classification Search
CPC . C01B 33/1585; C01B 33/159; C01B 33/158; C04B 28/26; C04B 2111/00568; C04B 2111/00577; C04B 2111/00405; C04B 2111/00612; C04B 2111/28; C04B 14/064; C04B 2111/52; C04B 2201/30; C09D 7/61; C01P 2006/90; C01P 2006/32
See application file for complete search history.

(56) References Cited

U.S. PATENT DOCUMENTS

| | | |
|---|---|---|
| 8,021,583 B2 | 9/2011 | Rouanet et al. |
| 10,112,796 B2 | 10/2018 | Kim et al. |
| 10,543,660 B2 | 1/2020 | Oikawa et al. |
| 2006/0125158 A1 | 6/2006 | Rouanet et al. |
| 2007/0004306 A1 | 1/2007 | Leeser et al. |
| 2008/0229704 A1 | 9/2008 | Augustyniak et al. |
| 2010/0140840 A1 | 6/2010 | Rouanet et al. |
| 2013/0344279 A1 | 12/2013 | Doshi et al. |
| 2014/0255628 A1 | 9/2014 | Fesmire |
| 2014/0273701 A1 | 9/2014 | Samanta et al. |
| 2016/0333572 A1 | 11/2016 | Samanta et al. |
| 2017/0266920 A1 | 9/2017 | Oikawa et al. |
| 2018/0010726 A1 | 1/2018 | Kim et al. |
| 2018/0029892 A1 | 2/2018 | Yu et al. |
| 2018/0086587 A1 | 3/2018 | Kim et al. |
| 2019/0107242 A1 | 4/2019 | Kim et al. |
| 2020/0048100 A1 | 2/2020 | Yu et al. |
| 2020/0122430 A1 | 4/2020 | Oikawa et al. |

FOREIGN PATENT DOCUMENTS

| | | |
|---|---|---|
| CN | 1749214 | 3/2006 |
| CN | 101318659 | 12/2008 |
| CN | 102503356 | 6/2012 |
| CN | 104556969 A | 4/2015 |
| CN | 105198375 A | 12/2015 |
| CN | 106457749 A | 2/2017 |
| CN | 107208355 A | 9/2017 |
| CN | 107244882 A | 10/2017 |
| EP | 3235788 A1 | 10/2017 |
| JP | 2008-505261 | 2/2008 |
| JP | 2010-525188 | 7/2010 |
| JP | 2011-162902 | 8/2011 |
| JP | 2015-528071 | 9/2015 |
| JP | 2018-021659 | 2/2018 |
| KR | 10-19977005524 | 10/1997 |
| KR | 10-20070100738 | 10/2007 |
| KR | 10-20090078357 | 7/2009 |
| KR | 10-20150122196 | 10/2015 |
| KR | 10-1599625 | 3/2016 |
| KR | 10-20170015288 | 2/2017 |
| KR | 10-20170031011 | 3/2017 |
| KR | 10-1748532 | 6/2017 |
| WO | 2008051029 | 5/2008 |
| WO | 2016-157784 | 10/2016 |
| WO | 2017-009858 | 1/2017 |

*Primary Examiner* — Anthony J Zimmer
*Assistant Examiner* — Jordan W Taylor
(74) *Attorney, Agent, or Firm* — Bryan Cave Leighton Paisner LLP

(57) ABSTRACT

Provided is a silica aerogel blanket capable of preventing deterioration of heat insulating performance while reducing dust generation, and method for manufacturing the same. The method manufactures a low-dust silica aerogel blanket by separately adding a silica sol to prevent an opacifying agent from being exposed to the surface of the silica aerogel blanket.

11 Claims, No Drawings

LOW-DUST SILICA AEROGEL BLANKET AND METHOD FOR MANUFACTURING SAME

CROSS-REFERENCE TO RELATED APPLICATIONS

This application is a National Stage Application of International Application No. PCT/KR2018/011078 filed on Sep. 19, 2018, which claims the benefit of Korean Patent Application No. 10-2017-0153280, filed on Nov. 16, 2017, in the Korean Intellectual Property Office, the disclosure of which is incorporated herein in its entirety by reference.

TECHNICAL FIELD

The present invention relates to a low-dust silica aerogel blanket and a method for manufacturing the same.

BACKGROUND

An aerogel is a high porous material composed of nanoparticles and has high porosity, high specific surface area and low thermal conductivity, and thus has been attracted as a high-efficiency heat insulating material, a soundproofing material, etc.

On the other hand, since the aerogel has a very low mechanical strength due to the porous structure thereof, an aerogel composite, in which a fibrous blanket such as inorganic fiber or organic fiber which is conventional heat insulating fiber is impregnated with aerogel to be bonded thereto, has been developed.

The aerogel blanket has flexibility, and thus can be bent, folded or cut in any desirable size or shape, and is easy to handle, and thus can be used not only in industrial applications such as a heat insulating panel for an LNG cable; heat insulating materials for industrial; or heat insulating materials for a spacesuit, transportation and vehicles, and electric power production, but in household goods such as jackets or athletic shoes.

The aerogel is typically manufactured through: a silica sol preparation step; a gelation step; an aging step; a surface modification step; and a drying step. To improve heat insulation performance and fire prevention performance of the aerogel blanket, in the silica sol preparation step, additives, such as an opacifying agent for shielding radiative conductivity or a metal hydroxide-based flame retardant for improving flame retardance performance, are generally used.

However, the additives weaken bonds of $SiO_2$ to reduce adhesion between a blanket substrate and the aerogel, thereby increasing dust generation. When the aerogel blanket is applied to a pipe or the like, the aerogel or the additives are continuously separated due to vibration of the pipe, so that the problem of dust generation is further deteriorated.

To improve the problem, U.S. Pat. No. 8,021,583 B2 discloses reducing dust generation by preparing aerogel granules or aerogel powder and filling the same in the form of slurry between fibers, but accompanies a problem of increasing thermal conductivity by a binder, etc. as compared with a gel casting method.

As described above, the aerogel blanket has a problem of generating a large amount of dust in construction, thereby causing health problems of an operator and inconvenience in construction, and thus it is necessary to improve ease of construction of the aerogel blanket by reducing the amount of dust generation.

PRIOR ART DOCUMENT (Patent Document 1) U.S. Pat. No. 8,021,583 B2 (Sep. 20, 2011)

DISCLOSURE OF THE INVENTION

Technical Problem

The present invention has been made to solve the problems of the prior art, and an aspect of the present invention provides a silica aerogel blanket capable of preventing deterioration of heat insulating performance while reducing dust generation, and a method for manufacturing the same.

Specifically, the present invention provides a method for manufacturing a silica aerogel blanket through which a low-dust silica aerogel blanket can be manufactured by separately adding silica sol such that an opacifying agent is not exposed to a surface of the silica aerogel blanket.

Technical Solution

According to the aspects of the present invention, there is provided a method for manufacturing a silica aerogel blanket, the method including: 1) adding a base catalyst to a first silica sol, impregnating a blanket substrate with the first silica sol, and gelling the first silica sol; 2) adding a base catalyst to a second silica sol, spraying the second silica sol onto the blanket substrate impregnated with the first silica sol, and gelling the second silica sol; and 3) adding a base catalyst to a third silica sol, spraying the third silica sol onto the blanket substrate impregnated with the second silica sol, and gelling the third silica sol, wherein the second silica sol further contains an opacifying agent.

According to another aspect of the present invention, there is provided a silica aerogel blanket including a first aerogel layer, a second aerogel layer and a third aerogel layer, wherein the second aerogel layer is interposed between the first aerogel layer and the third aerogel layer, and the second aerogel layer further contains an opacifying agent.

Advantageous Effects

According to the present invention, it is possible to manufacture a silica aerogel blanket capable of preventing deterioration of heat insulating performance while reducing dust generation.

The use of the silica aerogel blanket according to the present invention provides an effect that health problems of an operator and inconvenience in construction which are caused by dust generation are reduced, and thus ease of construction is improved.

DETAILED DESCRIPTION

Hereinafter, the present invention will be described in more detail to help understanding of the present invention. It will be understood that the words or terms should be interpreted as having a meaning that is consistent with their meaning in the context of the relevant art and the technical idea of the invention, based on the principle that an inventor can properly define the meaning of the words or terms to best explain the invention.

The present invention provides a silica aerogel blanket and a method for manufacturing the same, the silica aerogel blanket being capable of preventing deterioration of heat insulating performance while reducing dust generation by being manufactured in such a manner that an opacifying agent for shielding radiative conductivity which generally causes generation of a large amount of dust is not exposed to a surface of the aerogel blanket.

Hereinafter, the silica aerogel blanket and the method for manufacturing the same of the present invention will be described in detail.

Generally, in an aerogel blanket manufacturing process, an opacifying agent is used as an additive for shielding radiative conductivity, and since the opacifying agent is mixed with silica sol and gelled, the additive is directly exposed to a surface of an aerogel blanket, thereby generating a large amount of dust in construction.

Most of the dust generated in the aerogel blanket is derived from an additive which is added for the use of an opacifying agent rather than a crushed monolith. When the opacifying agent is not used or the use amount thereof is reduced to reduce the amount of dust generation, it is difficult to shield radiative conductivity and thermal conductivity at a high temperature is increased, so that heat insulating performance of the silica aerogel blanket can be poor.

Accordingly, the present invention attempts to reduce the amount of dust generation in the blanket by reducing the amount of the opacifying agent exposed to the surface of the aerogel blanket while maintaining the amount of the opacifying agent used.

Specifically, conventionally, since the opacifying agent is mixed with silica sol and gelled, the opacifying agent is directly exposed to the surface of the blanket, thereby causing a problem of generating a large amount of dust.

Accordingly, in order to solve the problem, the present invention is characterized in that the opacifying agent is separately added to the silica sol to prevent the opacifying agent from being exposed to the surface of the blanket.

Specifically, a method for manufacturing a silica aerogel blanket according to the present invention, the method characterized by including: 1) adding a base catalyst to a first silica sol, impregnating a blanket substrate with the first silica sol, and gelling the first silica sol; 2) adding a base catalyst to a second silica sol, spraying the second silica sol onto the blanket substrate impregnated with the first silica sol, and gelling the second silica sol; and 3) adding a base catalyst to a third silica sol, spraying the third silica sol onto the blanket substrate impregnated with the second silica sol, and gelling the third silica sol, wherein the second silica sol further contains an opacifying agent, and the first silica sol and the third silica sol do not further contain an opacifying agent.

The wording "the first silica sol and the third silica sol do not further contain an opacifying agent" means, in other words, that the first silica sol and the third silica sol each are composed of only a silica precursor and an ethanol without the opacifying agent.

The first silica sol and the third silica sol mean silica sol with which the both surfaces or one surface of the silica aerogel blanket is impregnated or silica sol sprayed onto the both surfaces or one surface of the silica aerogel blanket to be exposed to the surface of the blanket, and the second silica sol means silica sol with which an intermediate layer of the silica aerogel blanket is impregnated to be unexposed to the surface of the blanket.

When the silica aerogel blanket is manufactured through the above-described manufacturing method of the present invention, the opacifying agent is not contained in the both surfaces or one surface of the silica aerogel blanket, and only the intermediate layer contains the opacifying agent, so that the silica aerogel blanket capable of reducing dust generation while maintaining heat insulating performance can be manufactured.

On the other hand, the second silica sol can be sprayed after impregnation with and gelation of the first silica sol are completed. When the second silica sol is sprayed after gelation of the first silica sol is completed, it is more effective to prevent the opacifying agent contained in the second silica sol from permeating into the bottom of the blanket substrate and being exposed to the surface of the blanket.

Also, the third silica sol can be sprayed before gelation of the second silica sol is completed. When the third silica sol is sprayed after gelation of the second silica sol is completed, the blanket substrate cannot be impregnated with the third silica sol but the third silica sol can be gelled on the surface of the blanket without the blanket substrate, whereby durability of the gelation portion in the third silica sol is deteriorated and dust generation is somewhat increased.

On the other hand, the opacifying agent used in the present invention can be at least one selected from the group consisting of $TiO_2$, alumina, zirconia ($ZrO_2$), zinc oxide (ZnO), tin oxide ($SnO_2$), iron oxide, and carbon black.

In addition, the opacifying agent can be added in an amount of 1-30 wt %, more specifically 2.5-7.5 wt %, with respect to the weight of silica contained in the total silica sol. The total silica sol means a total weight of the first silica sol, the second silica sol and the third silica sol. When the opacifying agent is added in the above amount range, the radiative conductivity shielding effect is excellent.

When the amount is less than the above range, the heat insulating performance of the silica aerogel blanket at a high temperature can be poor, and when the amount exceeds the above range, the thermal conductivity at room temperature can be increased.

Furthermore, a volume ratio of the first silica sol, the second silica sol and the third silica sol is 10-40 vol %:20-80 vol %:10-40 vol % with respect to the total silica sol containing the first silica sol to the third silica sol.

When the amounts of the first silica sol and the third silica sol are less than the above range, it is difficult to expect the dust reduction effect because the second silica sol containing the opacifying agent is easily exposed to the surface of the blanket, and also when the amounts exceed the above range, it is difficult that the opacifying agent is uniformly dispersed in the glass fibers because the amount of the second silica sol, in which the opacifying agent is dispersed, is relatively insufficient.

The present invention also provides a silica aerogel blanket manufactured through the above-described method for manufacturing a silica aerogel blanket.

Specifically, the silica aerogel blanket of the present invention includes a first aerogel layer, a second aerogel layer, and a third aerogel layer, wherein the second aerogel layer is interposed between the first aerogel layer and the third aerogel layer, and the second aerogel layer can further contain an opacifying agent but the first aerogel layer and the third aerogel layer may not further contain an opacifying agent.

The wording "the first aerogel layer and the third aerogel layer may not further contain an opacifying agent" means, in other words, that the first aerogel layer and the third aerogel layer can be manufactured with only a silica precursor and an ethanol without the opacifying agent in the manufacture process thereof.

The first aerogel layer and the third aerogel layer can mean layers disposed on the both surfaces or one surface of the silica aerogel blanket, and the second aerogel layer can mean an intermediate layer of the silica aerogel blanket which is not exposed to the surface of the blanket as a layer interposed between the first aerogel layer and the third aerogel layer.

Furthermore, a weight ratio of the silica contained in the first aerogel layer, the second aerogel layer and the third aerogel layer can be 10-40 wt %:20-80 wt %:10-40 wt % with respect to the silica weight contained in the total aerogel layers including the first aerogel layer to the third aerogel layer.

When the amount of the silica contained in the first aerogel layer and the third aerogel layer is less than the above range, it is difficult to expect the dust reduction effect because the second aerogel layer containing the opacifying agent is easily exposed to the surface of the blanket, and also when the amount exceeds the above range, it is difficult that the opacifying agent is uniformly dispersed in the glass fibers because the amount of the second aerogel layer, in which the opacifying agent is dispersed, is relatively insufficient.

In addition, the opacifying agent of the present invention can be added in an amount of 1-30 wt %, more specifically 2.5-7.5 wt %, with respect to the silica weight contained in the total aerogel layers. When the opacifying agent is added in the above amount range, the radiative conductivity shielding effect is excellent.

Furthermore, the silica aerogel blanket of the present invention can have thicknesses of the first aerogel layer, the second aerogel layer and the third aerogel layer to 1-4 mm:2-8 mm:1-4 mm.

When the thicknesses of the first aerogel layer and the third aerogel layer are thinner than the above thickness range, the opacifying agent is disposed near the surface of the blanket, so that the dust reduction effect may not be excellent. When the thicknesses are thicker than the above thickness range, there can be a problem that the opacifying agent is not uniformly dispersed on the second aerogel layer.

The silica aerogel blanket of the present invention can have a weight reduction of 0.5% or less, more specifically 0.4% or less under a vibration condition of 18 Hz/6 hours, so that dust generation is reduced and health problems of an operator and inconvenience in construction are decreased, thereby improving the ease of construction.

The present invention also provides an insulating material including the silica aerogel blanket and further including a layer which is impermeable to water and permeable to water vapor on the surface of the silica aerogel blanket. When the additional layer formed on the surface of the silica aerogel blanket is impermeable to water, it is possible to prevent water from permeating into apparatus or a device to which the insulating material is applied, thereby preventing corrosion due to water. When the additional layer is permeable to water vapor, it is possible to prevent water vapor from condensing in an inside of apparatus or a device to which the insulating material is applied by permeating the water vapor out thereof, thereby preventing corrosion due to the water vapor.

More specifically, the layer which is impermeable to water and permeable to water vapor can be composed of a cellulose material.

Hereinafter, examples of the present invention will be described in detail in such a manner that it can easily be carried out by a person with ordinary skill in the art to which the present invention pertains. The invention can, however, be embodied in many different forms and should not be construed as being limited to the examples set forth herein.

EXAMPLE 1

A pre-hydrated TEOS and ethanol were mixed at a weight ratio of 3:1 to prepare 2040 mL of silica sol (an amount of silica was 4 wt % in silica sol).

1) 0.5 vol % of an ammonia catalyst was added to 30 vol % of the silica sol to initiate a gelation reaction, and thereafter prepared glass fibers were impregnated with the silica sol and the silica sol was gelled.

2) After completing the gelation, 4 g of an opacifying agent, that is $TiO_2$, was dispersed in 40 vol % of the silica sol, and thereafter 0.5 vol % of an ammonia catalyst was added thereto to initiate a gelation reaction, and then the silica sol was sprayed on the glass fibers and gelled.

3) Before completing the gelation, 0.5 vol % of an ammonia catalyst was added to 30 vol % of the remaining silica sol to initiate a gelation reaction, and thereafter the silica sol was sprayed on the glass fibers and gelled to prepare a silica wet-gel composite.

The silica wet-gel composite was left to age in an ethanol solution at a temperature of 50° C. for 1 hour, and a surface modifier solution (HMDS 7 vol %) which was prepared by mixing hexamethyldisilazane (HMDS) and an ethanol was added at 90 vol % with respect to the wet-gel to prepare a hydrophobic silica wet-gel composite by modifying the surface at 70° C. for 4 hours. Then, the hydrophobic silica wet-gel composite was placed in a 7.2 L supercritical extractor, and $CO_2$ was injected thereto. Thereafter, the temperature in the extractor was raised to 60° C. over 1 hour, and supercritical drying was performed at 50° C. and 100 bar to prepare a silica aerogel blanket.

Examples 2 and 3

A silica aerogel blanket was manufactured in the same manner as in Example 1 except that the ratio of the silica sol with which the glass fibers were impregnated or sprayed on the glass fibers in 1), 2) and 3) of Example 1 was the same as shown in Table 1.

Comparative Example 1

A pre-hydrated TEOS and ethanol were mixed in a weight ratio of 3:1 to prepare 2040 mL of silica sol (an amount of silica was 4 wt % in silica sol), and 4 g of an opacifying agent, that is $TiO_2$, was dispersed therein.

Thereafter, 0.5 vol % of an ammonia catalyst was added to initiate a gelation reaction, and then the mixture was sprayed on glass fibers to prepare a silica wet-gel composite.

The aging process, the surface modifying process and the supercritical drying process of the silica wet-gel composite were performed in the same manner as in Example 1 to prepare a silica aerogel blanket.

TABLE 1

|  | Volume ratio of silica sol added in 1), 2) and 3) (vol %) | Weight reduction (%) | Thermal conductivity at room temperature (mW/mK, 25° C.) | Backside temperature at high temperature (600° C., 6 hrs) (° C.) |
| --- | --- | --- | --- | --- |
| Example 1 | 30:40:30 | 0.3 | 18.79 | 181.9 |
| Example 2 | 10:80:10 | 0.4 | 18.80 | 182.0 |

TABLE 1-continued

| | Volume ratio of silica sol added in 1), 2) and 3) (vol %) | Weight reduction (%) | Thermal conductivity at room temperature (mW/mK, 25° C.) | Backside temperature at high temperature (600° C., 6 hrs) (° C.) |
|---|---|---|---|---|
| Example 3 | 40:20:40 | 0.3 | 18.69 | 181.8 |
| Comparative Example 1 | — | 1.2 | 18.72 | 182.4 |

Experimental Example 1: Measurement of Amount of Dust Generation

Each of the silica aerogel blankets prepared in Examples 1-3 and the Comparative Example was cut to a size of 12 cm×12 cm to prepare samples, and thereafter weight reductions by vibration were measured at a vibration condition of 18 Hz/6 hours, and the results are shown in Table 1.

*Weight reduction (%)=[(Weight of initial silica aerogel blanket−Weight of silica aerogel blanket after vibration test)/(Weight of initial silica aerogel blanket)]×100

As shown in Table 1, it was confirmed that the weight reductions of Examples 1-3 were significantly reduced compared with the Comparative Example. Therefore, it can be seen from the results that the amounts of dust generated in the silica aerogel blankets of Examples 1-3 are significantly smaller than that of the Comparative Example, and accordingly it can be expected that this result is due to the non-exposure of the opacifying agent to the surface of the silica aerogel blanket.

Experimental Example 2: Measurement of Thermal Conductivity

Thermal conductivities at room temperature of silica aerogel blankets respectively prepared in Examples 1-3 and the Comparative Example were measured by using an HFM 436 instrument of NETZSCH Co., Ltd., and the results are shown in Table 1.

As shown in Table 1, it was confirmed that the thermal conductivities at room temperature of the silica aerogel blankets in Examples 1-3 were equivalent to that of the Comparative Example. Therefore, it can be seen from the results that the silica aerogel blanket of the present invention can ensure low-dust characteristics without deteriorating the heat insulating performance at room temperature.

Experimental Example 3: Measurement of Backside Temperature at High Temperature Samples prepared by cutting each of the silica aerogel blankets prepared in Examples 1-3 and the Comparative Example to a size of 12 cm×12 cm were closely contacted with SiC plates at 600° C. for 6 hours, and thereafter backside temperatures were measured, and the results are shown in Table 1.

Adding the opacifying agent is to improve the heat insulating performance when exposed at a high temperature by shielding the radiative conductivity. Therefore, it was necessary to confirm in this experiment whether the heat insulating performance at a high temperature was maintained with respect to a method of adding the opacifying agent, and for this purpose, the backside temperatures of the samples closely contacted with the high temperature-plates were measured (all side-surfaces of the plates and the samples are in an insulated state). On the other hand, the better the heat insulating performance, the lower the backside temperature.

As shown in Table 1, it was confirmed that the backside temperatures at a high temperature of the silica aerogel blankets of Examples 1-3 were equivalent to that of the Comparative Example. Therefore, it can be seen from the results that the silica aerogel blanket of the present invention can ensure low-dust characteristics without deteriorating the heat insulating performance at a high temperature.

The foregoing description of the present invention has been provided for purposes of illustration, and it can be thus understood that a person skilled in the art to which the present invention pertains could easily modify the present invention into another specific form without changing the technical idea or essential features. Therefore, the examples described above are merely illustrative in all the aspects and should be construed as not being limited to the examples set forth herein.

The invention claimed is:

1. A method for manufacturing silica aerogel blanket, the method comprising:
   1) Adding a base catalyst to a first silica sol, impregnating a blanket substrate with the first silica sol, and gelling the first silica sol;
   2) adding a base catalyst to a second silica sol comprising an opacifying agent, spraying the second silica sol onto the blanket substrate impregnated with the first silica sol and gelling the second silica sol; and
   3) adding a base catalyst to a third silica sol, spraying the third silica sol onto the blanket substrate impregnated with the second silica sol and gelling the third silica sol, wherein the first silica sol and the third silica sol do not further comprise an opacifying agent.

2. The method of claim 1, wherein a volume ratio of the first silica sol, the second silica sol and the third silica sol is 10-40 vol %:20-80 vol %:10-40 vol %.

3. The method of claim 1, wherein the opacifying agent is added in an amount of 1-30 wt % with respect to the weight of silica contained in the total silica sol.

4. The method of claim 1, wherein the second silica sol is sprayed after gelation of the first silica sol is completed, and the third silica sol is sprayed before the gelation of the second silica sol is completed.

5. The method of claim 1, wherein the opacifying agent comprises at least one agent selected from the group consisting of $TiO_2$, alumina, zirconia ($ZrO_2$), zinc oxide (ZnO), tin oxide ($SnO_2$), iron oxide and carbon black.

6. A silica aerogel blanket, comprising a first silica aerogel layer, a second silica aerogel layer, and a third silica aerogel layer,
   wherein the second silica aerogel layer is interposed between the first silica aerogel layer and the third silica aerogel layer, and
   the second silica aerogel layer further comprises an opacifying agent,
   wherein the first silica aerogel layer and the third silica aerogel layer do not further comprise an opacifying agent.

7. The silica aerogel blanket of claim 6, wherein a weight ratio of silica contained in the first silica aerogel layer, the second silica aerogel layer, and the third silica aerogel layer is 10-40 wt %:20-80 wt %: 10-40 wt %.

8. The silica aerogel blanket of claim 6, wherein the opacifying agent is present in an amount of 1-30 wt % with respect to the total weight of silica contained in the first, second, and third silica aerogel layers.

9. The silica aerogel blanket of claim 6, wherein:
a thickness of the first silica aerogel layer is 1-4 mm;
a thickness of the second silica aerogel layer is 2-8 mm; and
a thickness of the third silica aerogel layer is 1-4 mm.

10. The silica aerogel blanket of claim 6, wherein the silica aerogel blanket has a weight reduction of 0.5% or less under a vibration condition of 18 Hz/6 hours.

11. An insulating material, comprising:
the silica aerogel blanket of claim 6; and
a layer which is impermeable to water and permeable to water vapor on a surface of the silica aerogel blanket.

* * * * *